Dec. 22, 1964  W. H. DUDAR  3,162,835
TIRE PRESSURE INDICATORS
Filed Jan. 29, 1962

INVENTOR.
WALTER H. DUDAR
BY
Alfred W. Petchaft
ATTORNEY

3,162,835
TIRE PRESSURE INDICATORS
Walter H. Dudar, Dallas, Tex., assignor to Tel-Air Corporation, Dallas, Tex., a corporation of Texas
Filed Jan. 29, 1962, Ser. No. 169,229
1 Claim. (Cl. 340—58)

This invention relates in general to certain new and useful improvement in tire pressure indicators and, more particularly, to an improved device for indicating when the pressure in a vehicle tire has fallen below a predetermined minimum value.

Today, it has become a common practice in the trucking industry to utilize axles equipped with dual wheels, especially in the case of large tractor trailer combinations. For trucks traveling large distances, it is important that the tires are maintained at a constant pressure according to the tire specifications. However, it is difficult to judge visually whether or not the tires are maintained at the proper pressure value and, therefore, the pressure in each of the tires is normally checked by a gauge at each of the refueling stops. This, however, is a time-consuming and laborious operation and, therefore, costly to the trucking company. Moreover, many drivers carelessly disregard the checking of the tire pressure. Finally, tires often lose pressure during travel and, if this condition remains undetected for an appreciable distance, the tire may be seriously damaged.

For example, in the case of dual wheels, it often happens that a small leak will develop in one of the tires resulting in such tire becoming partially or totally deflated, thereby increasing the load on the other tire. As many modern trucks are capable of traveling large distances without refueling, this condition might exist for a long period of time, causing rapid wear on the inflated tire. To alleviate this condition, many of the trucking companies have installed tire pressure indicators which are responsive to the air pressure in each of the tires and will indicate when the pressure in the tire has fallen below a predetermined value. Heretofore, however, such indicators have only been adapted for operation on a non-rotatable axle-spindle. These devices, however, were not adapted for use on the driving wheels which were mounted on a rotating or so-called driven axle.

It is, therefore, the primary object of the present invention to provide a tire pressure indicator which is quite sensitive and capable of rapidly responding to a drop in tire pressure.

It is another object of the present invention to provide a tire pressure indicator of the type stated which can be mounted on a rotatable axle or spindle.

It is a further object of the present invention to provide a tire pressure indicator of the type stated which is adapted for use on dual tire assemblies mounted on rotatable axles.

It is an additional object of the present invention to provide a tire pressure indicator of the type stated which can be quickly and easily installed on the driving axle of an automotive vehicle.

It is also an object of the present invention to provide a tire pressure indicator of the type stated which is sturdy and yet simple in construction, providing trouble-free operation.

With the above and other objects in view, my invention resides in the novel features of form, construction, arrangement, and combination of parts presently described and pointed out in the claim.

In the accompanying drawing (one sheet)—

Figure 1:
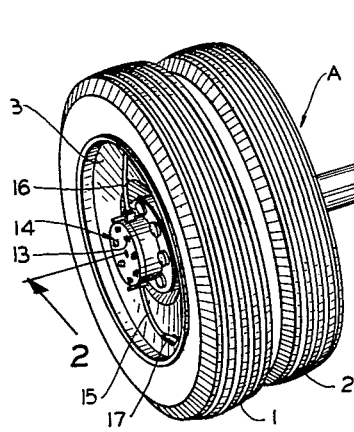
FIG. 1 is a fragmentary perspective view of a dual tire and wheel assembly having mounted thereon a tire pressure indicator constructed in accordance with and embodying the present invention.

Referring now in more detail and by reference characters to the drawing, which illustrates a preferred embodiment of the present invention, A designates a dual wheel assembly including tires 1, 2, which are mounted on wheels 3, 4, respectively, which are, in turn, provided with brake drum 5 mounted concentrically with respect thereto. Welded or otherwise rigidly secured to the other end of the rotatable or driven axle 6 in a conventional manner is a circular wheel-mounting flange-plate 7 to which the wheels 3, 4, are secured and, finally, the latter are conventionally journaled on an axle housing 8 by means of bearings 9.

The brake drums include conventional brake shoes 10 which are conventionally actuated by operating mechanisms 11 mounted externally on the axle housing 8 and enclosed by a so-called backing plate 12.

Figures 4, 5:
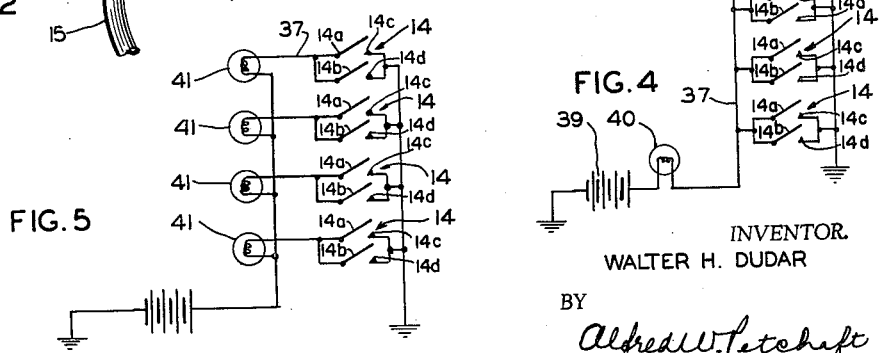
FIG. 4 is a schematic wiring diagram of the electrical circuit forming a part of the present invention.
FIG. 5 is a schematic wiring diagram of a modified form of electrical circuit forming a part of the present invention.

Secured upon the outer end of the wheel-mounting flange-plate 7 by means of bolts 13 and an annular dielectric spacing gasket g is a cylindrical sensing unit 14 having air-pressure conduits 15, 16, which are respectively connected to the valve stems 17 of the tires 1, 2. The construction and operation of the sensing unit 14 is more fully described in United States Letters Patent No. 2,874,-241, and, therefore, neither illustrated nor described in detail herein. It is sufficient for present purposes merely to point out that each sensing unit 14 contains two pressure responsive switches comprising switch blades 14ª, 14ᵇ and contacts 14ᶜ, 14ᵈ respectively as shown in FIGURES 4 and 5. As explained in the aforementioned patent, the blades 14ª, 14ᵇ are held open by the pressure of the tires 12 communicated through the conduits 15, 16 so that when the pressure in any tire drops below the safe level the switch blade, associated with such tire, will close and transmit a signal current as will presently more fully appear.

Figure 2:
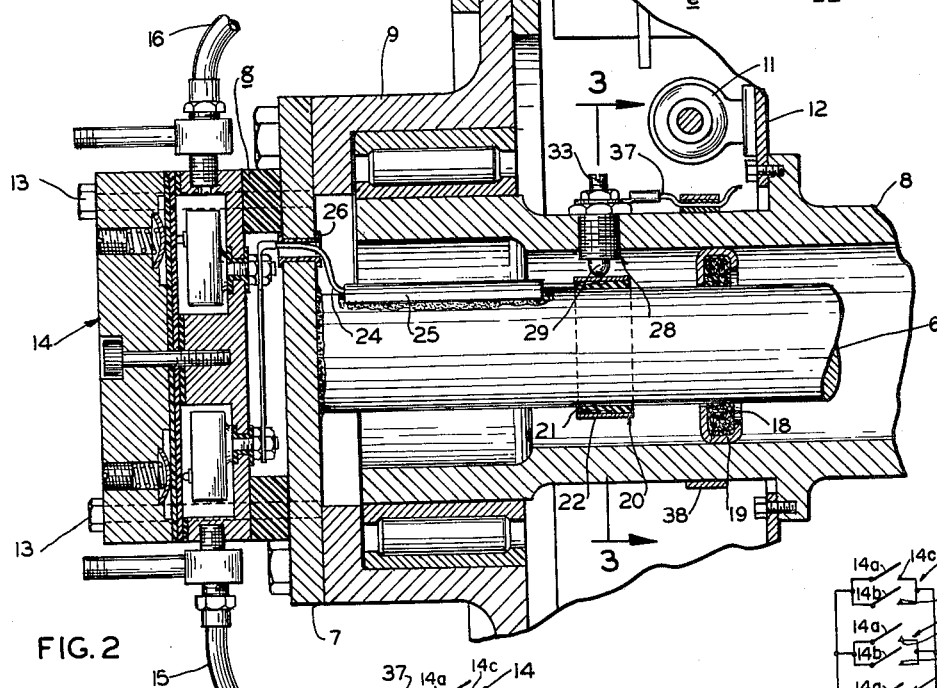
FIG. 2 is a longitudinal sectional view taken along line 2—2 of FIG. 1.

Mounted concentrically on the axle 6 inwardly of the flange-plate 7 is an annular sealing ring 18 mounted within a suitable collar 19 substantially as shown in FIG. 2. Mounted on the axle 6 intermediate the sealing ring 18 and the flange-plate 7 is a commutator 20 generally comprising an inner dielectric band 21 and an outer contact band 22 preferably formed of copper or other suitable current-conducting material. Thus, it can be seen that the commutator 20 is electrically insulated from the axle 6. The commutator 20 should preferably be formed with an axial slit 23 in the provision of two opposed ends e, e′ which can be spread apart so that commutator 21 may be securely attached to the axle 6 by means of an epoxy-resin adhesive or any other suitable means. A lead wire 24 enclosed within a flat ribbon-like insulating tape 25 extends through a nylon grommet 26 set into and projecting through the flange-plate 7. Inwardly of the grommet 26, the tape 25, runs axially along the outer face of the axle 6, being secured thereto by epoxy resin adhesive. At its inner end the lead wire 24 is electrically connected to the commutator 20 and at its outer end the lead wire 24 is electrically connected to the sensing unit 14.

The axle housing 8 is radially bored in alignment with the commutator 20 and securely seated therein is a hollow cylindrical brush-supporting sleeve 27 preferably formed of nylon or other suitable dielectric material for providing electrical insulation between the sleeve 27 and housing 8. The brush-supporting sleeve 27 includes an integrally formed diametrally enlarged head 28 which abuts the outer surface of the axle housing 8. Disposed within the hollow portion of the brush-supporting sleeve 27 is a brush 29 preferably formed of carbon or copper containing graphite and which includes an enlarged head portion 30 and a diametrally reduced stem 32, which projects axially through the sleeve 27. The sleeve 27 is internally threaded at its upper end for accommodating a brush-retaining plug 33 which is internally bored at its lower end in the provision of a guide channel 34 for snugly but, nevertheless, slidably accommodating the stem 32. A compression spring 35 is interposed between the enlarged head 30 and the lower end of the brush-retaining plug 33 for maintaining the enlarged head 30 in brushwise contact with the commutator 20. Thus, it can be seen that the brush 29 will always be urged into electrical contact with the commutator 20 even after continuous wear. Rigidly secured between the enlarged head 28 and an annular flange 36 integrally formed on the plug 33 and in electrical contact therewith is a conductor 37 which is secured to the outer wall of the axle housing 8 by means of a conventional clamp 38. The upper end of the plug 33 is also centrally kerfed for accommodating a conventional screw driver (not shown).

The conductor 37 is then connected through the vehicle battery 39 to a warning light 40, as schematically shown in FIG. 4, the warning light 40 preferably being mounted on the dashboard of the vehicle. It should be obvious that other types of warning devices, such as buzzers and the like, can be substituted for the light 40.

Figure 3:
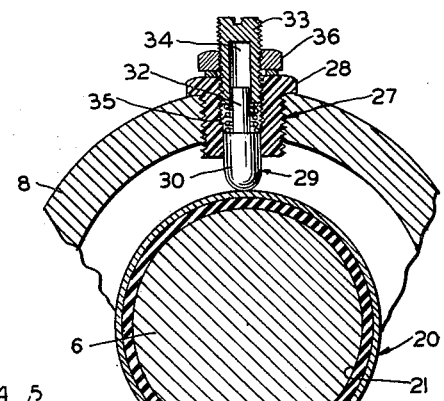
FIG. 3 is a transverse sectional view taken along line 3—3 of FIG. 2.

In use, the tires 1, 2 are filled through their valve stems to the desired operating air-pressure. The sleeve 11 and the sensing unit 14 will rotate with the powered axle 6, also carrying therewith the lead wire 24 and the commutator 21. Should either of the tires 1, 2, be punctured or otherwise suffer a reduction in pressure, the sensing unit 14 will detect the loss of pressure in the manner described in the above-mentioned United States Letters Patent No. 2,874,241, and produce an electric signal in the lead wire 24. As the stationary brush 29 is in contact with the commutator 21, the impulse will be delivered through the brush 29 through the electrically connected brush-supporting plug 33, through the conductor 37 and to the warning light 40, thereby illuminating the same. The driver can then check the tires to see which one is low and inflate such tire to the proper pressure or repair the same as the conditions of the tire may indicate. It can be seen by reference to FIG. 3 that the axle housing 8 is insulated from the brush 29 through the dielectric sleeve 27, thereby preventing a short circuit of the warning system.

It is possible to provide a modified form of electrical circuit, substantially as shown in FIG. 5, where each of the sensing units 14 are connected to individual warning lights 41 which are preferably located on the dashboard of the vehicle. In this type of circuitry, the vehicle operator is able to determine which tire assembly has suffered the reduced pressure and accordingly check either of the tires forming part of the assembly.

It should be understood that changes and modifications in the form, construction, arrangement, and combination of the several parts of the tire pressure indicators may be made and substituted for those herein shown and described without departing from the nature and principle of my invention.

Having thus described my invention, what I claim and desire to secure by Letters Patent is:

In an air-pressure signaling system for pneumatic tires of a vehicle, said tires being mounted on a rotatable axle, said axle being mounted within an axle housing which system also includes a pressure sensing unit mounted on the end of said axle; conductor means providing an electrical connection from the moving wheel and sensing unit carried thereby to a stationary annunciator located in the vehicle, said conductor means consisting of an annular contact band adhesively secured to and electrically insulated from said axle, a flexible first conductor electrically connected at one end to the annular contact band and extending axially along the exterior surface of said axle, said first conductor being electrically connected at its other end to said sensing unit, tape means having an epoxy resin adhesive secured to said axle and said first conductor for retentively holding the first conductor on said axle, said axle housing having a radial bore, a dielectric sleeve mounted within said bore, a contact brush mounted within said sleeve and being in electrical contact with said contact band, an electrically conductive plug mounted with said sleeve for retaining said brush within said sleeve, spring means interposed between said plug and said brush for biasing said brush into contact with said band, and a second conductor connected to said brush and to said annunciator for maintaining a circuit therebetween.

References Cited by the Examiner
UNITED STATES PATENTS

| | | | |
|---|---|---|---|
| 2,523,594 | 9/50 | Sagaser et al. | 340—58 X |
| 2,740,855 | 4/56 | Wellpott et al. | 200—61.25 |
| 2,874,241 | 2/59 | Bardin et al. | 200—61.25 |

NEIL C. READ, *Primary Examiner.*
ROBERT H. ROSE, *Examiner.*